(12) United States Patent
Hutter, III

(10) Patent No.: US 8,141,829 B2
(45) Date of Patent: Mar. 27, 2012

(54) LOW PROFILE ADHESIVE MOUNTED FIXTURE BUTTON

(75) Inventor: Charles G. Hutter, III, Carson City, NV (US)

(73) Assignee: Physical Systems, Inc., Carson City, NV (US)

( * ) Notice: Subject to any disclaimer, the term of this patent is extended or adjusted under 35 U.S.C. 154(b) by 72 days.

(21) Appl. No.: 12/791,585

(22) Filed: Jun. 1, 2010

(65) Prior Publication Data

US 2010/0314511 A1 Dec. 16, 2010

Related U.S. Application Data

(60) Provisional application No. 61/186,725, filed on Jun. 12, 2009.

(51) Int. Cl.
A47G 1/17 (2006.01)
A44B 11/25 (2006.01)
B25G 3/34 (2006.01)
B32B 9/00 (2006.01)

(52) U.S. Cl. ............ 248/205.3; 248/683; 403/267; 24/304; 428/40.1

(58) Field of Classification Search ........... 248/205.4, 248/205.3, 74.2, 56; 428/40.1, 343; 403/267, 403/268; 24/304, DIG. 11
See application file for complete search history.

(56) References Cited

U.S. PATENT DOCUMENTS

| | | | | |
|---|---|---|---|---|
| 2,835,060 A | * | 5/1958 | Staaf | 40/618 |
| 2,987,098 A | * | 6/1961 | Daniel | 156/391 |
| 4,193,434 A | | 3/1980 | Wagner | |
| 4,302,492 A | * | 11/1981 | Hutter, III | 428/40.1 |
| 4,338,151 A | * | 7/1982 | Hutter, III | 156/719 |
| 4,400,856 A | | 8/1983 | Tseng | |
| 4,421,288 A | * | 12/1983 | Blaszkowski | 248/205.4 |
| 4,668,546 A | * | 5/1987 | Hutter, III | 428/41.8 |
| 4,678,150 A | * | 7/1987 | Newman et al. | 248/205.3 |
| 4,778,702 A | * | 10/1988 | Hutter, III | 428/40.9 |
| 4,822,656 A | * | 4/1989 | Hutter, III | 428/41.8 |
| 4,830,558 A | * | 5/1989 | Sweeney | 411/258 |
| 4,840,337 A | * | 6/1989 | Zaugg | 248/115 |
| 4,870,725 A | | 10/1989 | Dubowik | |
| 5,487,523 A | * | 1/1996 | Ingram et al. | 248/551 |
| 6,727,466 B2 | * | 4/2004 | Hutter, III | 219/201 |
| 7,055,360 B2 | * | 6/2006 | Hamerski et al. | 72/379.2 |
| 7,294,385 B1 | * | 11/2007 | Stephen | 428/98 |
| 2003/0035684 A1 | * | 2/2003 | Hutter, III | 403/267 |

* cited by examiner

*Primary Examiner* — Kimberly Wood
(74) *Attorney, Agent, or Firm* — Lowry Blixseth LLP; Stuart O. Lowry; Scott M. Lowry

(57) ABSTRACT

A low profile fixture button is provided for adhesive attachment to a substrate in a temporary or substantially permanent manner. The fixture button includes a plurality of preferably four over-center spokes substantially in a common plane and carrying a mounting plate having a pressure sensitive adhesive material thereon. The spokes are carried by an outer backstop rim, and are initially oriented with the mounting plate advanced toward the substrate. In a preferred form, the backstop rim seats within a counterbore formed in the rear side of a larger attachment adapted for low profile mounting onto the substrate. Pressing of the fixture button toward the substrate engages the advanced mounting plate with adhesive thereon with the substrate, and forces the spokes to displace over-center to a retracted position withdrawn substantially into the backstop rim and any associated larger attachment for low profile mounting onto the substrate.

19 Claims, 11 Drawing Sheets

LOW PROFILE ADHESIVE MOUNTED FIXTURE BUTTON

BACKGROUND OF THE INVENTION

This invention relates generally to an improved attachment device for adhesively mounting a selected attachment structure onto a selected substrate. More particularly, this invention relates to an improved and low profile fixture button for use in quickly and easily mounting a selected attachment structure onto the substrate in a low profile manner and in a desired temporary or substantially permanent mounted relationship.

SUMMARY OF THE INVENTION

In accordance with the invention, a low profile fixture button is provided for adhesive attachment to a substrate in a temporary or substantially permanent manner. The fixture button includes a plurality of at least three and preferably four over-center spokes substantially in a common plane, and carrying a mounting plate having a pressure sensitive adhesive material thereon. The spokes are carried by a relatively rigid outer backstop structure, such as an outer backstop rim fitted with close tolerance into a counterbore formed in an attachment structure, and are initially oriented with the mounting plate advanced toward the substrate. Pressing of the fixture button and/or pressing of the attachment structure carrying the fixture button toward the substrate engages the advanced mounting plate with adhesive thereon with the substrate, and forces the spokes to displace over-center to a retracted position withdrawn substantially into the backstop rim or backstop structure and any associated larger attachment structure for low profile mounting onto the substrate.

In the preferred form, the low profile fixture button comprises a unitarily molded plastic component which can have a small diametric size on the order of about 0.5 inch, and a small thickness on the order of about 0.125 inch. The molded fixture button comprises a backstop rim having a closed loop, preferably circular, shape. The multiple spokes are carried at outer ends thereof by the backstop rim, wherein the radially outer ends of these spokes are formed substantially in a common plane and are adapted for up-down hinged displacement relative to the backstop rim along substantially linear hinges extending generally tangentially relative to a center axis of the fixture button. The multiple spokes in turn define radially inner ends hingedly coupled along inner hinges to relatively short beams upstanding from an upper side of the mounting plate. These inner hinges are also substantially linear in form, extending substantially in parallel with the outer hinge of the associated spoke.

In an initial, as-molded and non-deformed state, the multiple spokes extend radially inwardly and angularly downwardly between the outer backstop rim and the beams on the mounting plate. An adhesive material such as a foam tape layer coated on opposite sides with the pressure sensitive adhesive is carried on the underside of the mounting plate, preferably initially including a protective peel-off ply or strip. This peel-off ply is removed to permit adhesive mounted placement of the fixture button onto a selected substrate, at which time the adhesive material and mounting plate of the fixture button are pressed against the substrate with a sufficient force to displace the multiple spokes over-center thereby retracting the mounting plate relative to the outer backstop rim for low profile and substantially flush mounting of the fixture button onto the substrate. The upstanding beams on the mounting plate flex inwardly a sufficient distance to accommodate this over-center movement of the spokes. In a preferred form, the mounting plate further includes radial notches formed therein for receiving the spokes in the over-center retracted position, thereby achieving a substantially optimized low profile geometry.

In a preferred form, the fixture button is sized and shaped for close tolerance reception, as by press-fitting, into a shallow bore or counterbore formed in a larger attachment structure. One or more of the fixture buttons may be thus mounted onto a rear side of the attachment structure for low profile and substantially flush mounting thereof onto the substrate. If desired, a curable bonding agent can be applied to a rear side surface of the attachment structure in a position surrounding or circumscribing the fixture button, whereupon the resilient pressure sensitive adhesive material urges the attachment structure with a positive force toward the substrate to achieve a substantially optimum strength bonded attachment thereto. In a alternative preferred form, the backstop rim of the fixture button may be integrally molded with the larger attachment structure.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 5 is an exploded vertical sectional view showing assembly of an adhesive material such as a layer of pressure sensitive adhesive material onto the lower mounting plate of the low profile fixture button in the as-molded configuration as viewed in FIGS. 1 and 2 with;

DETAILED DESCRIPTION OF THE PREFERRED EMBODIMENTS

Figure 8:
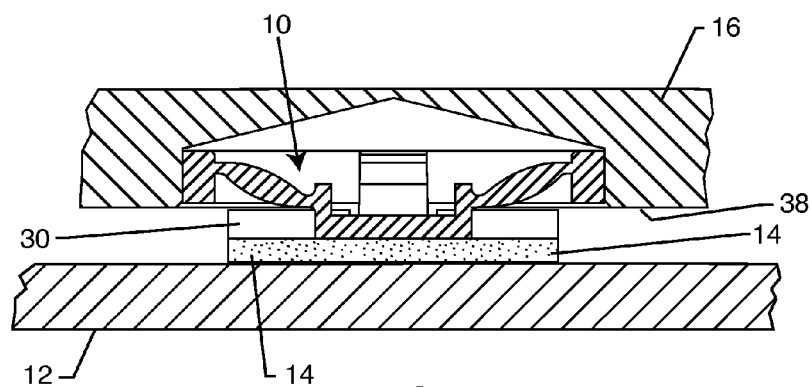
FIG. 8 is a fragmented vertical sectional view similar to FIG. 7, but depicting initial engagement of the lower mounting plate in the advanced position, with adhesive material thereon, with a substrate.
Figure 9:
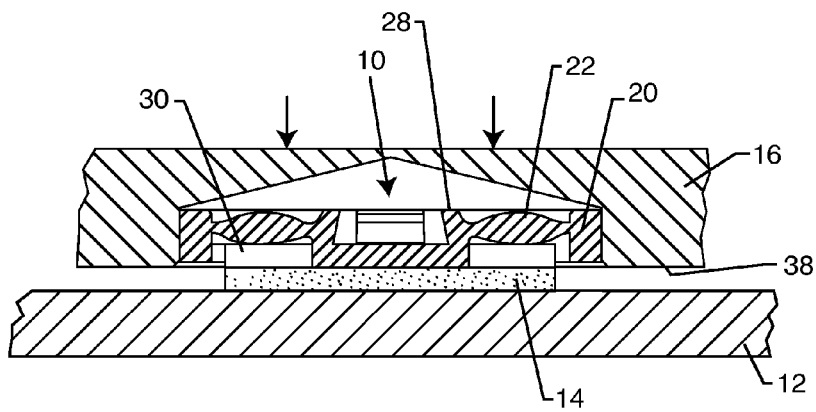
FIG. 9 is a fragmented vertical sectional view similar to FIGS. 7-8, and showing pressed engagement of the lower mounting plate with the substrate to displace the radial spokes from their as-molded configuration to a substantially common plane.
Figure 10:
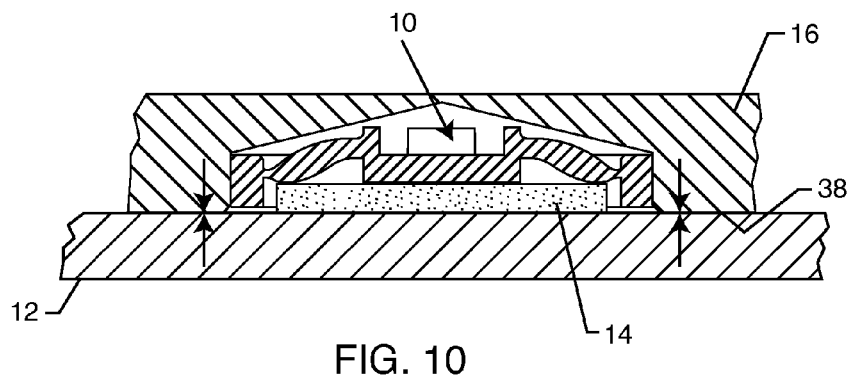
FIG. 10 is a fragmented vertical sectional view similar to FIGS. 7-9, but illustrating spoke displacement over-center for displacing the lower mounting plate to the actuated position substantially retracted into the fixture button outer rim and associated attachment counterbore for low profile mounting of the attachment relative to the substrate.

As shown in the exemplary drawings, a low profile fixture button referred to generally in FIGS. 1-4 by the reference numeral 10 is provided for low profile adhesive mounting onto a selected substrate 12 (FIGS. 8-10). In use, the low profile fixture button 10 includes a relatively thin and resilient layer or film 14 (FIGS. 5-10) of a pressure sensitive adhesive material or the like suitable for pressed engagement with and mounting onto the substrate 12. The adhesive mounting may be temporary in nature, wherein the adhesive material 14 can be manually stripped from the substrate 12. Alternately, if desired, the adhesive mounting may be substantially permanent in nature, wherein the adhesive material 14 provides a positive force for drawing a larger attachment structure 216 (FIGS. 15-16) into substantially flush engagement with the substrate 12 while a curable bonding agent 18 disposed between the attachment structure 216 and the substrate 12 cures.

As shown best in FIGS. 1-4, the low profile fixture button 10 of the present invention comprises a generally disk-shaped button formed conveniently as a unitary plastic molding from a selected plastic material such as an acetal plastic or the like, wherein this disk-shaped button 10 can be relatively small and thin in size. The button 10 comprises an outer backstop rim 20 having a closed loop shape, with a preferred circular rim geometry being shown in FIGS. 1-4. Persons skilled in the art will recognize and appreciate, however, that alternative closed loop rim configurations, such as triangular or rectangular, etc., may be employed. This backstop rim 20 may be relatively thin and flexible, provided that the button 10 is fitted into another structure (as will be described) to prevent rim flexing during use. Alternately, if desired, the backstop rim 20 may be comparatively thicker and sturdier to prevent significant flexing in use, whereby the low profile button 10 can be adhesively mounted directly onto a substrate 12 in the absence of any additional attachment structure.

The backstop rim 20 carries multiple radially inwardly projecting spokes 22. At least three spokes 22 are required to provide balanced forces as the spokes 22 are displaced over-center, as will be described herein in more detail. The illustrative drawings show four equiangularly spaced spokes 22 oriented in radially opposed pairs. Each spoke 22 is coupled with the backstop rim 20 along substantially linear outer hinge lines 24, each of which extends generally tangentially to a center axis of the circular backstop rim 20. From their respective outer hinges 24, the spokes 22 project radially inwardly to substantially linear inner hinge lines 26 which couple the spokes 22 to a corresponding plurality of short beams 28 upstanding from a mounting plate 30.

Figure 1:
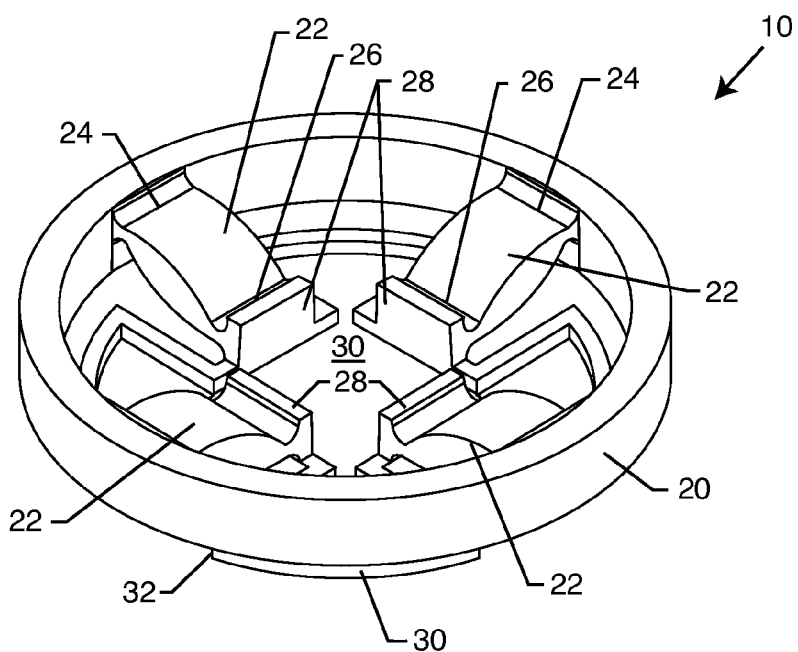
FIG. 1 is a perspective view illustrating a low profile fixture button embodying the novel features of the invention, and showing the fixture button in an initial, as-molded configuration.
Figure 2:
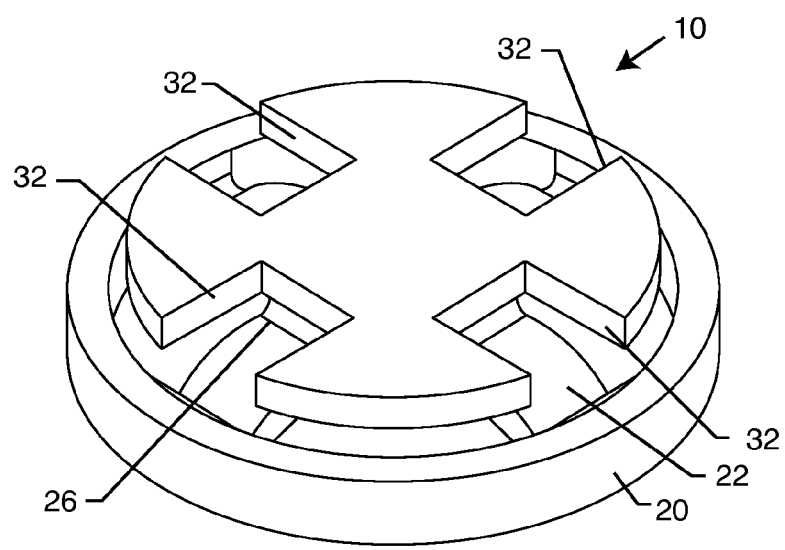
FIG. 2 is a bottom perspective view of the low profile fixture button of FIG. 1, and illustrating a lower mounting plate in an initial, as-molded advanced position.
Figure 3:
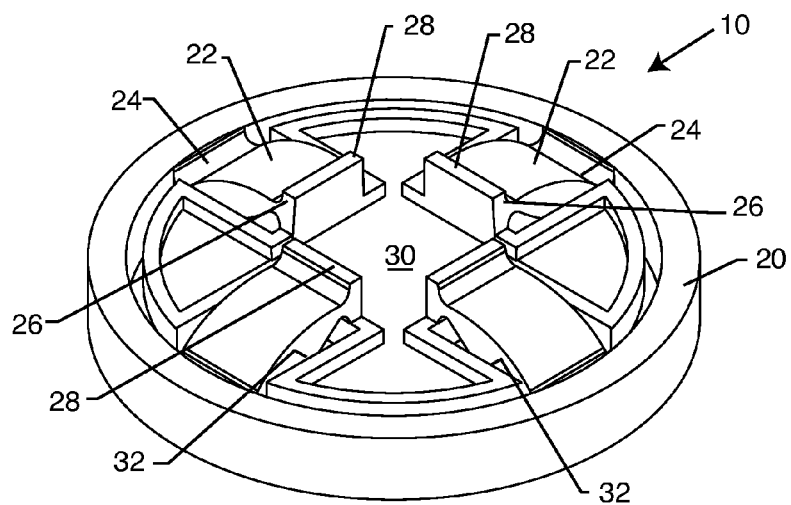
FIG. 3 is a top perspective view of the low profile fixture button of FIG. 1, but showing the fixture button in an actuated position with radial spokes thereof displaced over-center relative to their as-molded orientations shown in FIG. 1.
Figure 4:
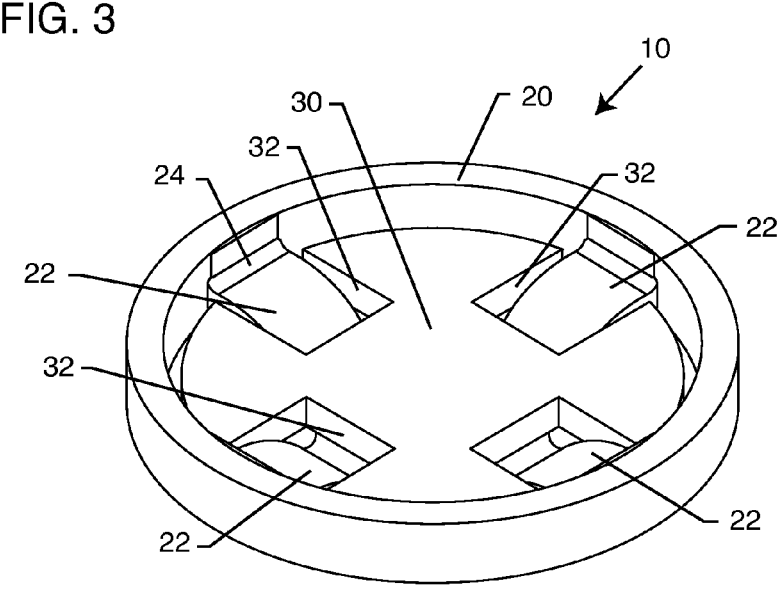
FIG. 4 is a bottom perspective view of the low profile fixture button shown in the actuated position with the lower mounting plate thereof retracted.

FIGS. 1 and 2 show the low profile fixture button 10 in an as-molded, non-deformed state, with the four spokes 22 projecting radially inwardly and angularly downwardly from the linear outer hinges 24 at the backstop rim 20 to the linear inner hinges 26 at the short beams 28 on the mounting plate 30. In one preferred form, this entire as-molded fixture button 10 may be formed with a small diametric size of about 0.5 inch, and a total thickness of about 0.125 inch. Different and/or larger button sizes may, of course, be used. FIG. 2 shows the mounting plate 30 having a plurality of radially outwardly open notches 32 formed therein in generally radial alignment with the multiple spokes 22. In this non-deformed condition, the mounting plate 30 is advanced downwardly relative to the backstop rim 20, to position the mounting plate 30 a short distance below (as viewed best in FIG. 2) the backstop rim 20. By contrast, FIGS. 3-4 show the fixture button 10 in a deformed configuration with the spokes 22 shifted over-center to fit generally within the radially open notches 32 formed in the mounting plate 30. As shown, in this deformed condition, the mounting plate 30 is generally retracted (FIG. 4) a short distance into the plane of the backstop rim 20. The notches 32 enable the mounting plate 30 to extend radially outwardly between the spokes 22 for a substantially maximum total plate surface area, with a plate outer periphery terminating a short distance from the backstop rim 20 (FIGS. 2 and 4).

Figure 5:
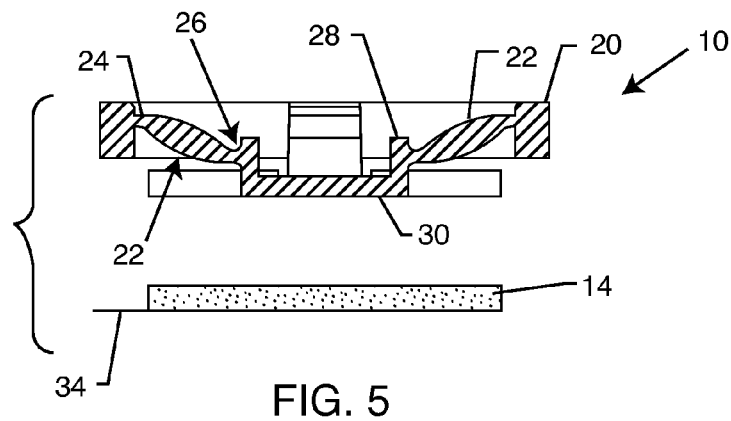

The adhesive material 14 comprises, in the preferred form, a segment of foam-based tape or the like coated on opposite sides with a suitable pressure sensitive adhesive film (FIG. 5). This adhesive material 14 thus provides a discrete, albeit relatively thin, structure having a degree of resiliency. This resilient adhesive material 14 is pressed onto the exposed underside of the mounting plate 30, preferably to cover the entire diametric dimension thereof including the radially open notches 32. As shown best in FIG. 5, the surface area contact and resultant surface area adhesion between the adhesive material 14 and the mounting plate 30 is thereby maximized. A paper-based peel-off ply or strip 34 or the like initially covers the pressure sensitive adhesive at the exposed underside of the adhesive material 14.

Figure 6:
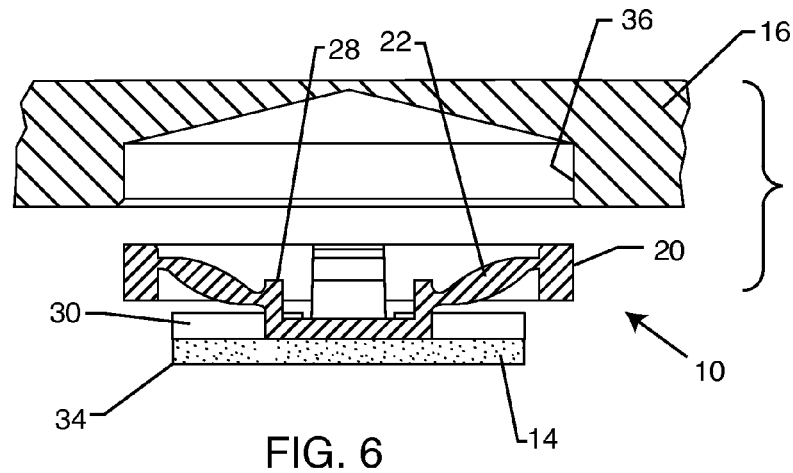
FIG. 6 is an exploded vertical sectional view similar to FIG. 5, but illustrating further assembly of the low profile fixture button and adhesive material as shown in FIG. 5 into a matingly sized counterbore formed in the rear side or underside of a larger attachment.
Figure 7:
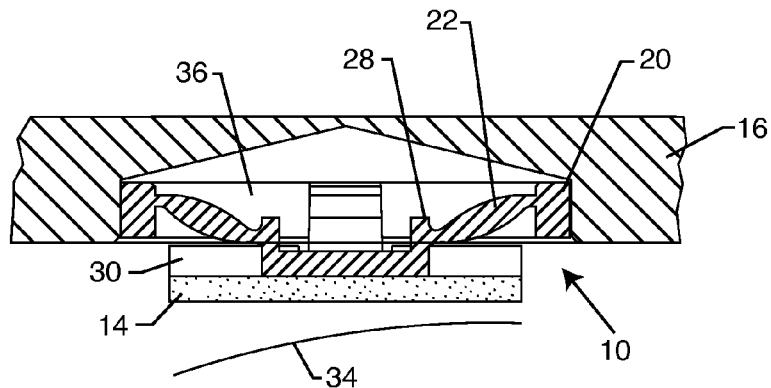
FIG. 7 is a vertical sectional view showing initial removal of a protective film from the adhesive material carried by the mounting plate of the low profile fixture button.

FIG. 6 illustrates seated reception of the fixture button 10 with the adhesive material 14 thereon into a shallow counterbore 36 formed in the underside, or the rear side, of a larger attachment structure 16. In this regard, the backstop rim 20 of the fixture button 10 is preferably sized and shaped for relatively close tolerance, substantially press-fit or friction-fit reception into the counterbore 36. The counterbore 36 is sized with a depth to receive and support the backstop rim 20 substantially completely within the counterbore, but wherein the mounting plate 30 with adhesive material 14 thereon is advanced a short distance below or beyond the plane of the attachment structure 16, when the fixture button 10 is in the initial non-deformed state.

In this configuration, the peel-off ply 34 is removed from the adhesive material 14 to expose the pressure sensitive adhesive film (FIG. 7), and the attachment structure 16 is pressed against the substrate 12 (FIG. 8). Such pressing action effectively lands the adhesive material 14 onto the substrate 12, and then presses the mounting plate 30 toward a retracted position with the spokes 22 displaced over-center to withdraw the plate 30 substantially into the backstop rim 20 and the associated attachment structure counterbore 36. FIG. 9 shows partial movement toward this retracted position, with the multiple spokes 22 oriented substantially co-planar and with the short beams 28 deflected radially inwardly a sufficient distance to accommodate over-center spoke movement, in combination with compression of the adhesive material 14. FIG. 10 shows the mounting plate 30 with adhesive material 14 thereon in the retracted position, with a rear face 38 of the attachment structure 16 seated firmly and substantially flush against the substrate 12. FIG. 10 also shows the adhesive material 14 slightly stretched, or under tension, for positively urging and retaining the rear face 38 of the attachment structure 16 against the substrate 12.

In accordance with the invention, the linear hinges 24 and 26 beneficially provide consistent, reliable and forced-balanced over-center displacement of the spokes 22, particularly when the spokes 22 are arranged in opposed pairs as shown. By contrast, partial or incomplete over-center displacement, resulting in undesirable cocking or canting of the mounting plate 30 and associated adhesive material 14 are substantially avoided. In addition, the linear hinges 24 and 26 cooperate with the slightly deformable beams 28 to accommodate over-center movement in a device having the spokes 22 oriented substantially in a common plane, thereby provided the fixture button with an optimally low profile geometry.

Figure 11:
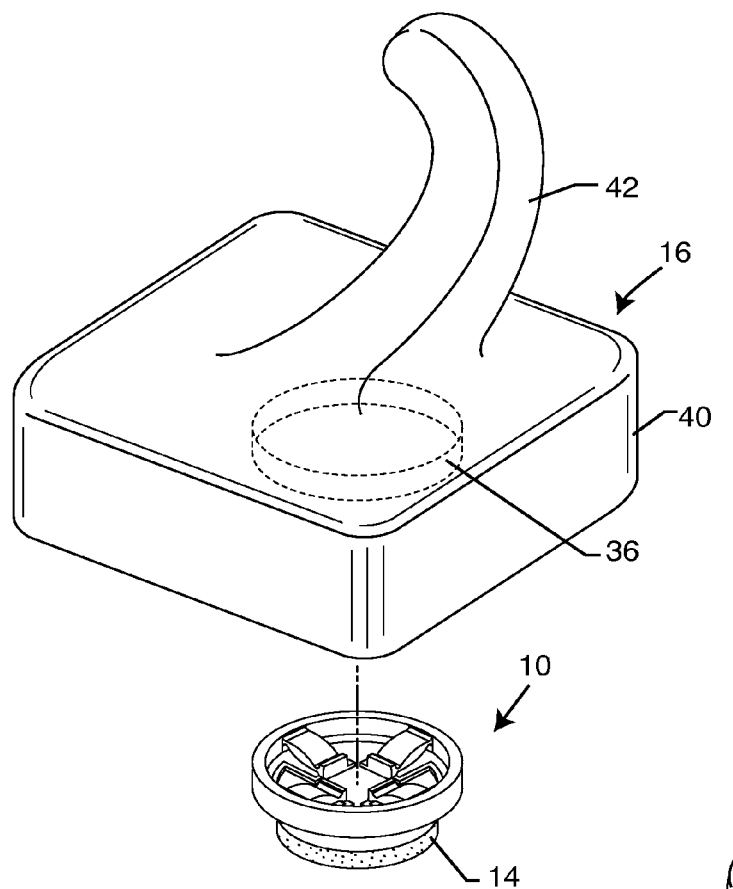
FIG. 11 is a top exploded perspective view showing the attachment in the form of a hook.
Figure 12:
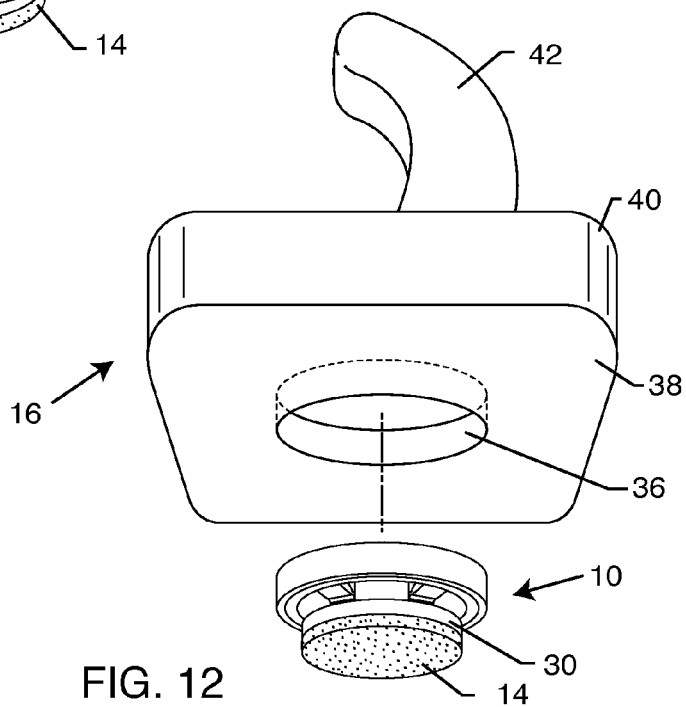
FIG. 12 is a bottom exploded perspective view showing the hook-style attachment of FIG. 11.

FIGS. 11-12 show one possible form for the attachment structure 16 having the counterbore 36 formed in a rear side or rear face 38 thereof for friction-fit reception of one of the low profile fixture buttons 10 of the present invention. FIGS. 11-12 show a generally rectangular attachment structure body 40 having a hook device 42 projecting from a front side or front face thereof.

Figure 13:
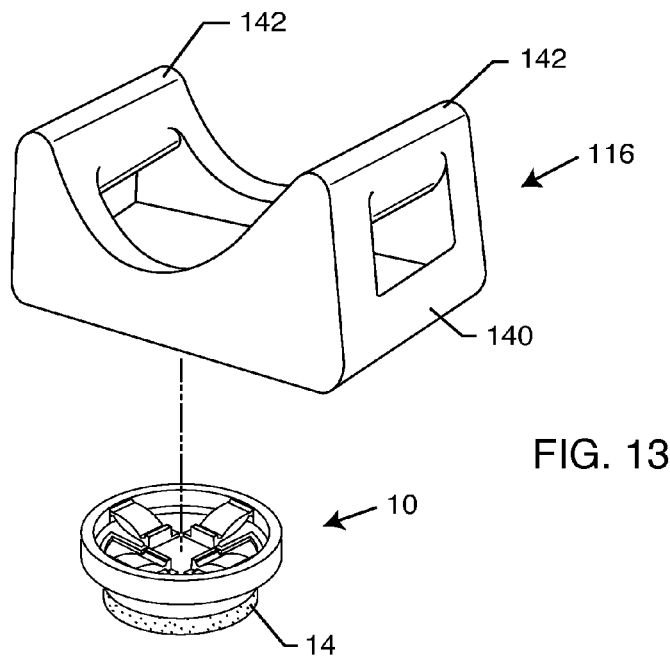
FIG. 13 is a top exploded perspective view showing the attachment in the form of a wire bundle retainer.
Figure 14:
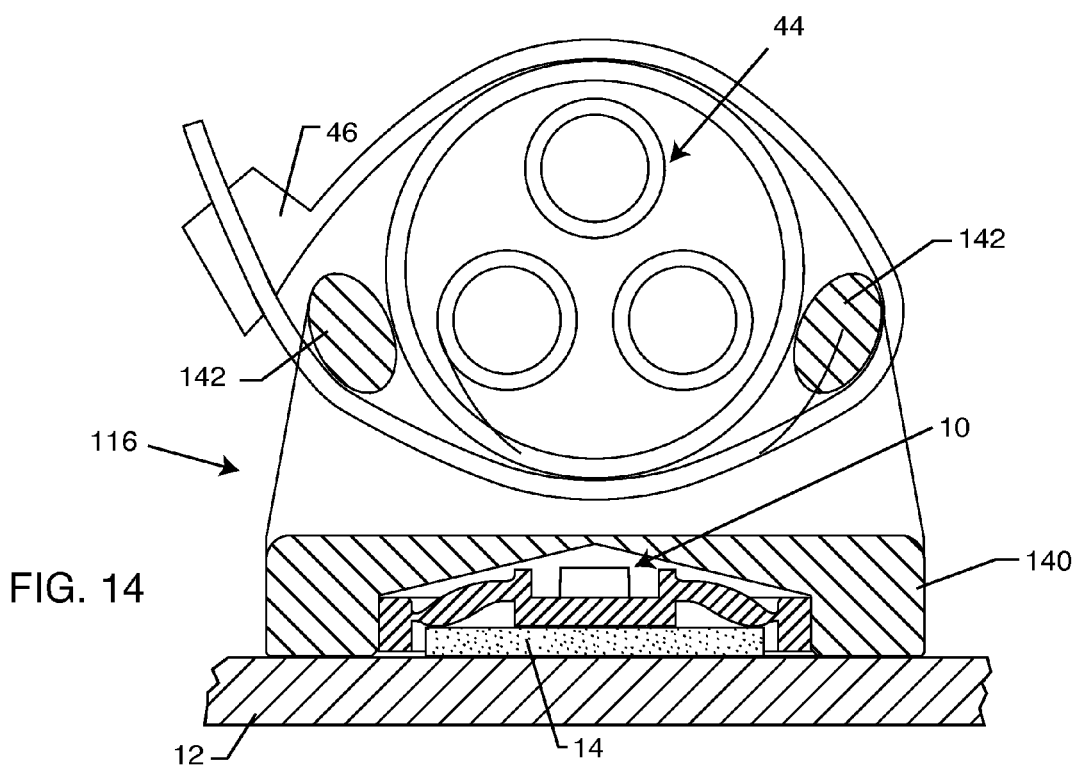
FIG. 14 is a fragmented vertical sectional view similar to FIG. 10, but illustrating the attachment in the form of the wire bundle retainer and further showing a bundle of wires or the like retained thereon.

FIGS. 13-14 show a modified attachment structure 116 in the form of a wire bundle retainer having a generally rectangular body 140 with at least one and preferably a pair of wire-receiving closed-loop retainers 142 formed therein. FIGS. 13-14 show this modified attachment structure 116 in association with a low profile fixture button 10 of the present invention. FIG. 14 further shows a bundles of wires 44 retained on said retainers 142 by means of a suitable strap lock 46 or the like.

Figure 15:
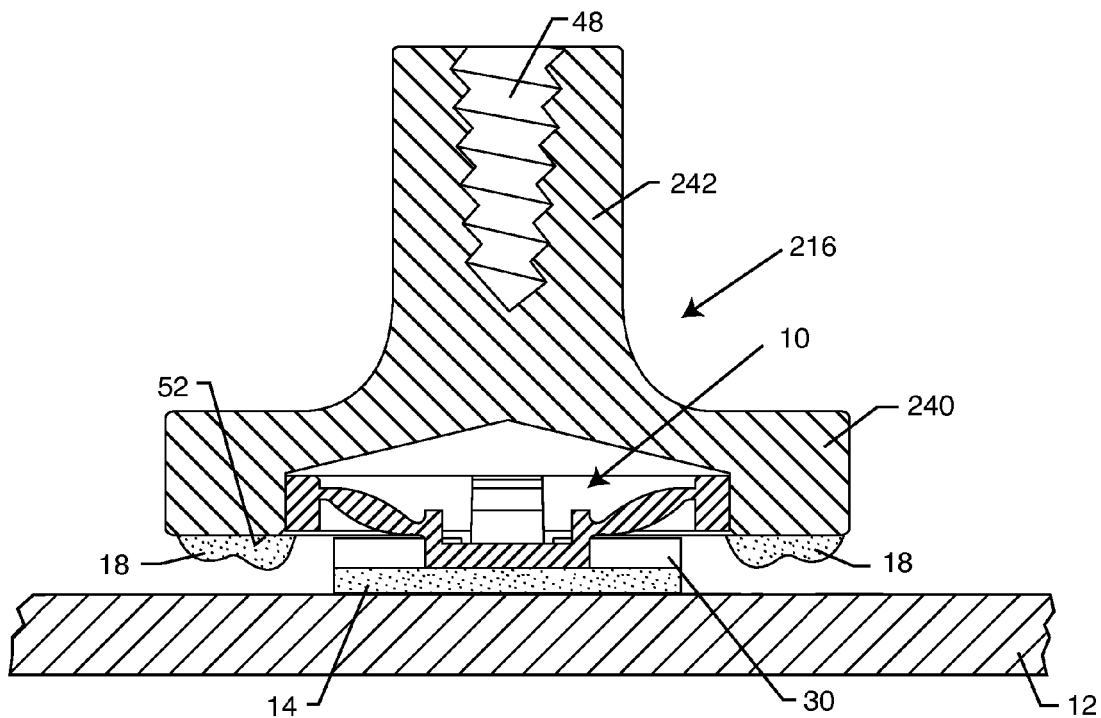
FIG. 15 is a fragmented vertical sectional view showing the attachment in the form of a threaded nut having a lower flange initially spaced from the substrate when the fixture button is in the initial as-molded position, and further illustrating optional and substantially permanent bonded affixation of the attachment to the substrate.
Figure 16:
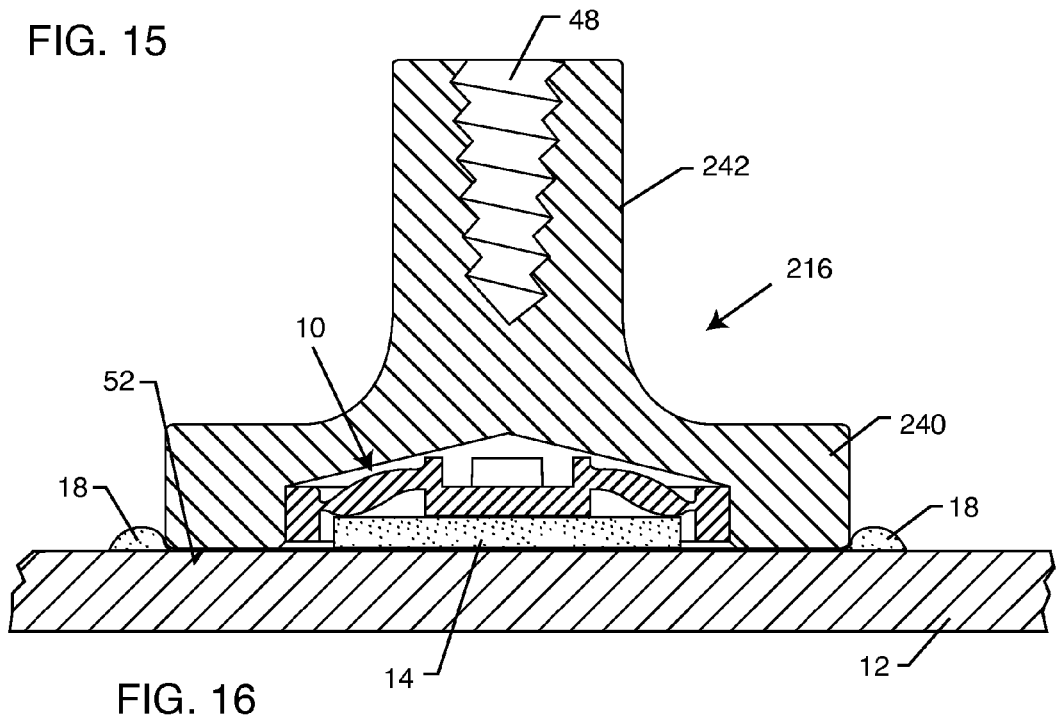
FIG. 16 is a fragmented vertical sectional view similar to FIG. 15, and showing the fixture button in the actuated position for substantially permanent bonding of the attachment flange onto the substrate.

FIGS. 15-16 show another modified attachment structure 216 in the form of a body 240 with an upstanding post 242 defining an internally threaded nut 48. Persons skilled in the art will appreciate that other alternative attachment structures, such as a threaded fastener, etc., may be used. FIGS. 15-16 further depict substantially permanent bond-on affixation of the attachment structure 216 by applying the curable bonding agent 18 to a rear-side surface 52 of the body 240, and then using the over-center fixture button 10 to apply a positive force by means of the resilient adhesive material 14 to draw the body surface 52 into intimate seated engagement with the substrate 12 while the bonding agent 18 cures. Importantly, such bond-on mounting of the attachment structure 216 to the substrate 12 entombs and conceals the fixture button 10 within the cured bonding agent 18 (FIG. 16) and thus avoids any need to remove the fixture button 10 after curing of the bonding agent. In addition, a closed loop and preferably annular bond-on connection to the substrate 12 has been found to provide substantially optimized adhesive bonding strength.

Figure 17:
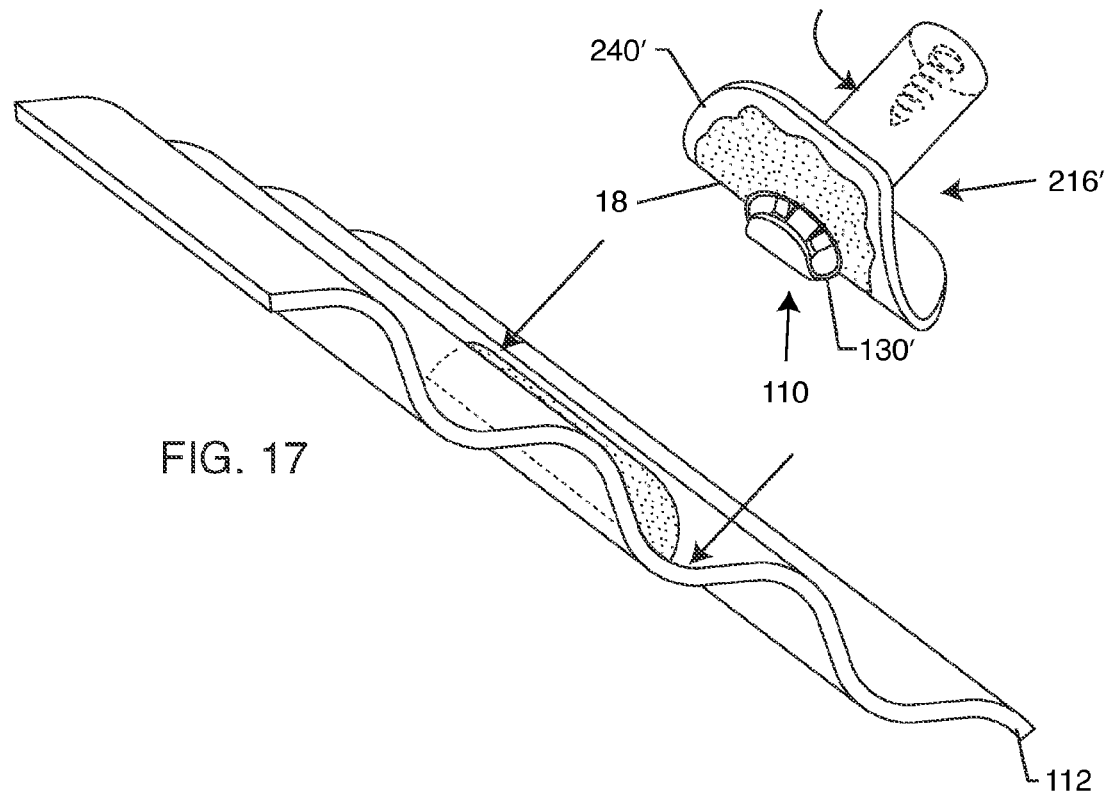
FIG. 17 is an exploded perspective view showing a modified form of the fixture button wherein the lower mounting plate has a generally curved or non-planar shape for attachment to a curved or non-planar shaped substrate.
Figure 18:
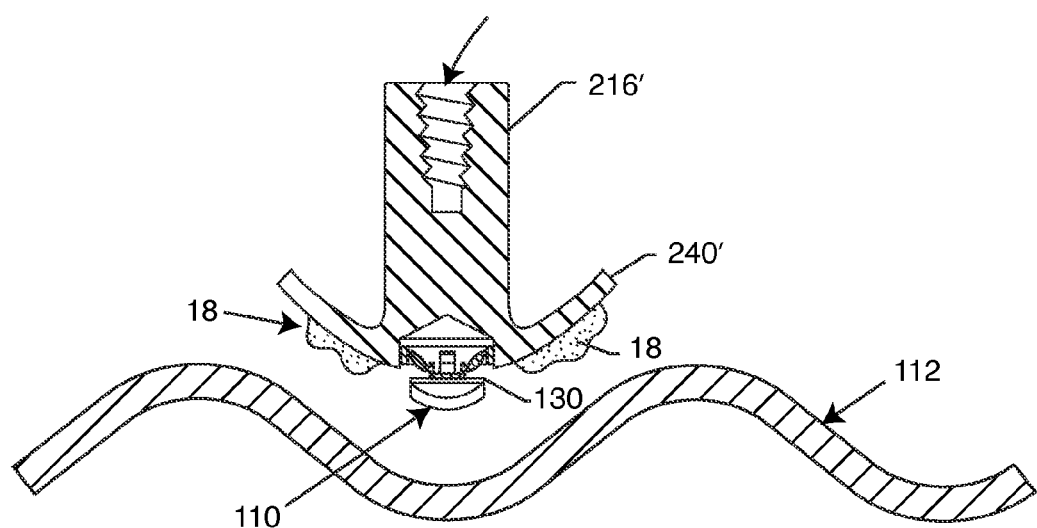
FIG. 18 is an exploded sectional view similar to FIG. 17, and illustrating mounting of the embodiment of FIG. 17 onto the a curved or non-planar substrate surface.

FIGS. 17-18 show a modified fixture button 110 in combination with a modified attachment structure 216', wherein the fixture button 110 includes a mounting plate 130 having a curved or non-planar shape such as the illustrative downwardly convex shape for seated adhesive mounting onto a curved or non-planar substrate 112, such as an upwardly concave valley of a corrugated substrate. Similarly, the attachment structure 216' is modified from the form shown in FIGS. 15-16 to define a body 240' having a curved or non-planar shape such as the illustrative downwardly convex shape for seated reception into the upwardly concave valley of the corrugated substrate 112. If desired, substantially permanent bond-on attachment can be achieved by use of the bonding agent 18 as shown and described with respect to FIGS. 15-16.

While the bonding agent 18 is shown in FIGS. 15-18 only, persons skilled in the art will recognize that the bonding agent 18 may be used with any of the disclosed embodiments wherein a substantially permanent bond-on adhesive mounting is desired. Similarly, persons skilled in the art will appreciate that the fixture button 10 of the present invention can be modified so that the mounting plate 30 thereof has any of a variety of different selected planar and non-planar shapes for adhesive mounting onto a substrate of mating shape.

Figure 19:
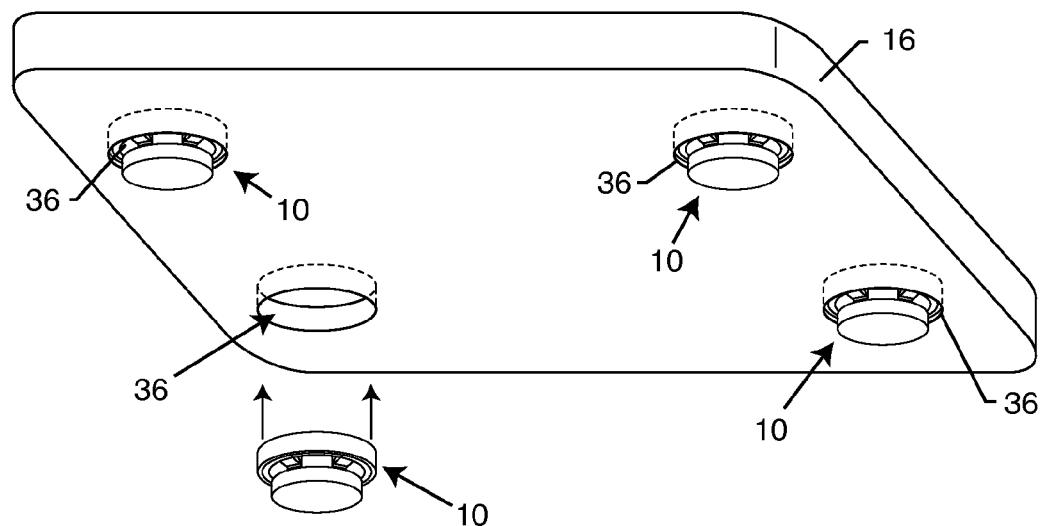
FIG. 19 is an exploded perspective view depicting a plurality of fixture button installed at a rear side of an attachment such as a sign.
Figure 20:
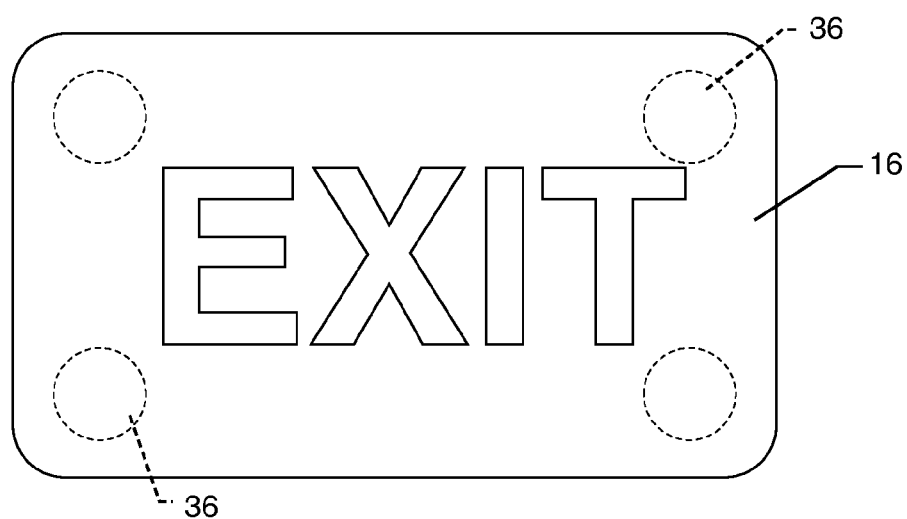
FIG. 20 is a front elevation of the sign attachment shown in FIG. 19.

FIGS. 19-20 show multiple fixture buttons 10 of the present invention mounted as by press fitting or the like into respective counterbores 36 formed in the rear side of an attachment structure 16 shown in the form of a sign or plaque or the like. As shown, the counterbores 36 are formed near each of the corners of a generally rectangular attachment structure and fitted each with one of the fixture buttons 10. Thereafter, upon removal of the peel-off plies 34, the sign 16 is then pressed against a suitable substrate (not shown) such as a wall surface or the like for substantially flush adhesive mounting (as shown in FIGS. 7-10).

Figure 21:
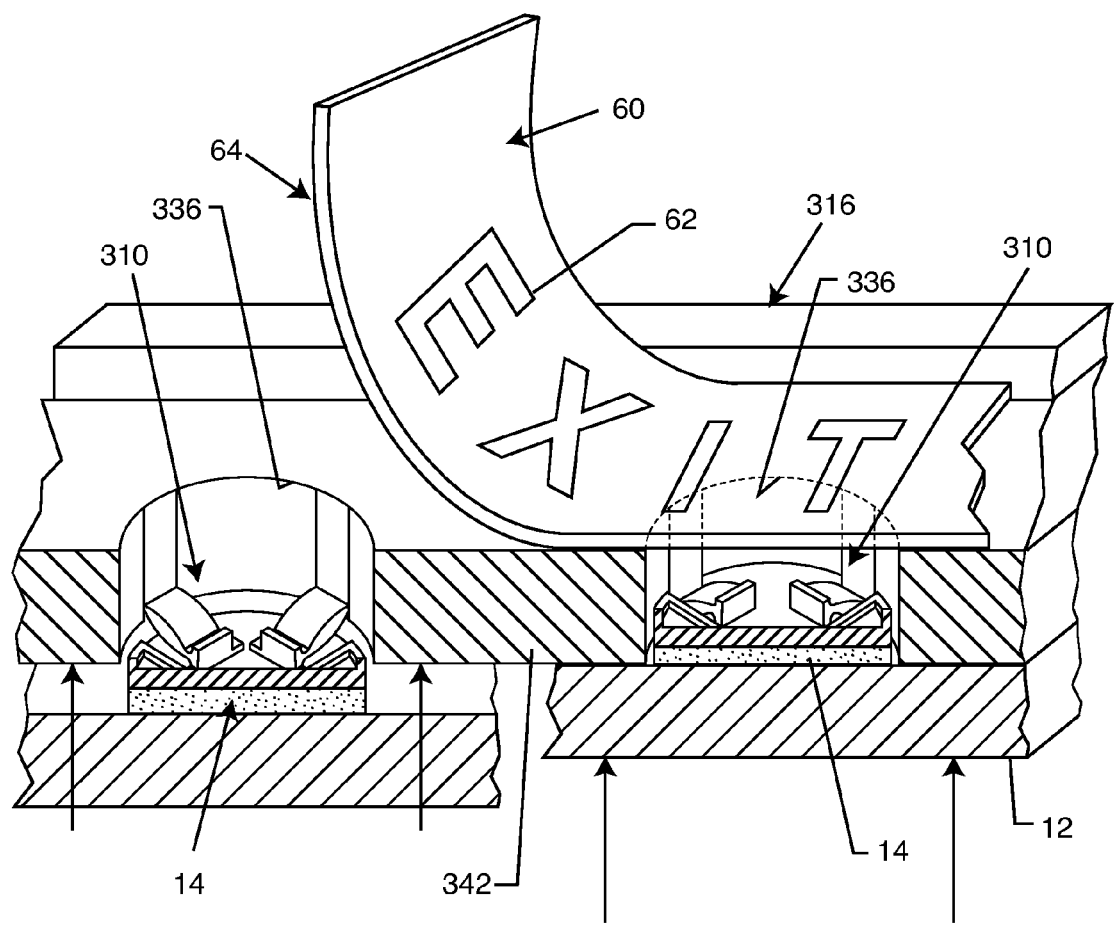
FIG. 21 is a fragmented vertical sectional view showing a further modified form of the fixture button of the present invention, wherein the fixture button is formed as an integral component of the attachment.

FIG. 21 shows a modified attachment structure 316 wherein at least one and optionally multiple modified fixture buttons 310 are carried within bores 336 formed at selected positions within the structure 316. In accordance with this embodiment, the fixture buttons 310 are integrally molded into an attachment body 342, whereby the attachment body comprises the closed loop backstop rims for each of the fixture buttons 310. A surface sign layer 60 bearing appropriate indicia 62 such as lettering or the like has an adhesive film 64 or the like on the reverse side thereof for quick and easy mounting onto the attachment body 342. This modified attachment structure 316 including the modified fixture buttons 310 is flush-mounted onto a substrate 12 in the same manner as previously shown and described herein.

Figure 22:
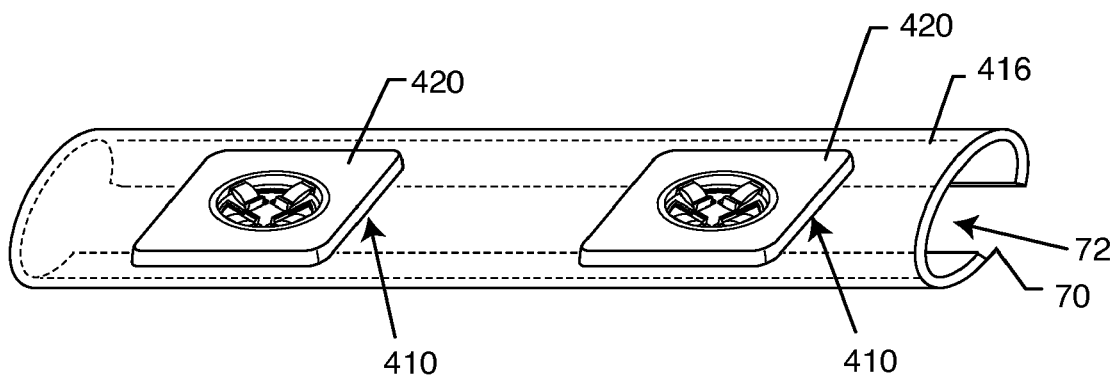
FIG. 22 is a fragmented perspective view showing multiple fixture buttons according to one preferred form slidably installed into an attachment in the form of an elongated track member.
Figure 23:
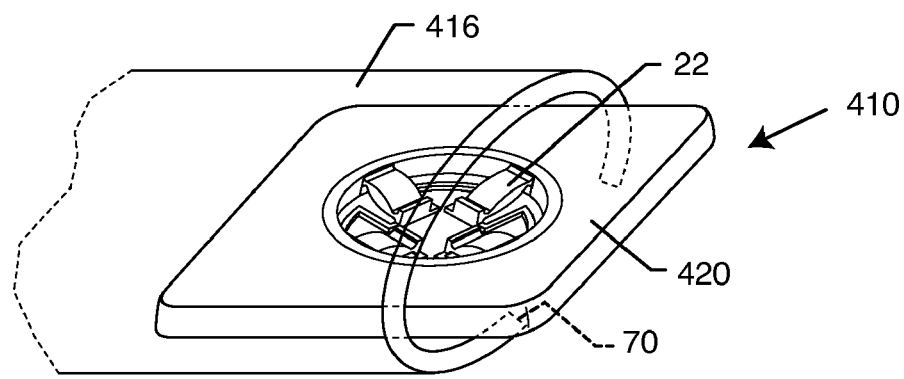
FIG. 23 is an enlarged and fragmented perspective view showing slide-fit installation of one of the fixture buttons of FIG. 22 into the elongated track member.
Figure 24:
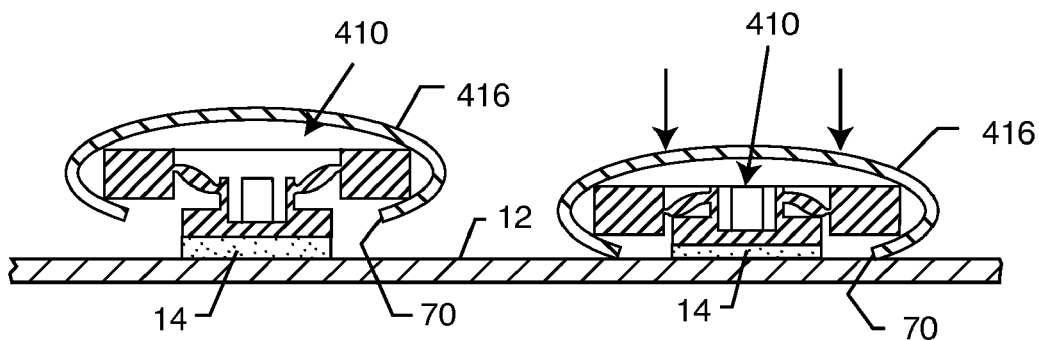
FIG. 24 is a fragmented vertical sectional view depicting low profile adhesive mounting of the elongated track member onto a substrate.

Finally, FIGS. 22-24 show a further modified arrangement of the invention wherein multiple fixture buttons 410 of the present invention are each formed with a modified backstop rim 420 having a non-circular shape, such as the illustrative generally rectangular configuration. These modified fixture buttons 410 are slidably positioned within a modified attachment structure 416, such as an elongated trim strip or the like used in automotive manufacturing, defining a rearwardly open slot 70 accessing a track 72 (FIG. 22). When one or more of the fixture buttons 410 is slidably positioned within the track 72, the associated peel-off ply 34 is removed and the attachment structure 416 (trim strip) is pressed against a substrate 12 (FIG. 24) to substantially flush adhesive mounting of the attachment structure 416.

A variety of further modifications and improvements in and to the low profile fixture button of the present invention will be apparent to those persons skilled in the art. Accordingly, no limitation on the invention is intended by way of the foregoing description and accompanying drawings, except as set forth in the appended claims.

What is claimed is:

1. A fixture button for adhesive securement to a substrate, said fixture button comprising:
    a central plate;
    an outer backstop structure;
    a plurality of at least three over-center spokes extending radially between said central plate and said outer backstop structure; and
    adhesive means carried by said central plate for adhesively securing the fixture button to a substrate;
    said over-center spokes initially supporting said central plate in an advanced position relative to said outer backstop structure, said central plate being landable on the substrate and movable to a retracted position relative to said outer backstop structure to displace said over-center spokes to a relatively low profile and substantially co-planar orientation.

2. The fixture button of claim 1 wherein said adhesive means comprises a pressure sensitive adhesive.

3. The fixture button of claim 1 wherein said adhesive means comprises a segment of foam tape having a pressure sensitive adhesive on opposite sides thereof.

4. The fixture button of claim 1 wherein said outer backstop structure comprises a closed loop configuration.

5. The fixture button of claim 4 wherein said outer backstop structure comprises a generally circular outer rim.

6. The fixture button of claim 4 wherein said outer backstop structure has a relatively low profile configuration having a size and shape for close tolerance friction fit within a counterbore formed in an attachment device.

7. The fixture button of claim 6 further including an adhesive bonding agent carried in a closed loop configuration by said attachment device.

8. The fixture button of claim 1 wherein said plurality of at least three over-center spokes comprises a plurality of four equiangularly arranged over-center spokes.

9. The fixture button of claim 1 wherein said central plate has a plurality of at least three radially outwardly open notches for partial reception of said over-center spokes when said central plate is in said retracted position.

10. The fixture button of claim 1 wherein said central plate, said plurality of over-center spokes, and said outer backstop structure comprise an integrally molded plastic component.

11. The fixture button of claim 1 wherein said plurality of over-center spokes are coupled respectively between said central plate and said outer backstop structure by a plurality of linear hinges.

12. The fixture button of claim 1 wherein the fixture button has a diametric size of about 0.5 inch, and a total thickness of about 0.125 inch when said central plate is in said advanced position.

13. An attachment assembly for adhesive securement to a substrate, said attachment assembly comprising:
    a low profile fixture button including a central plate, an outer backstop structure, a plurality of at least three over-center spokes extending radially between said central plate and said outer backstop structure, and temporary adhesive means carried by said central plate for adhesively securing the fixture button to a substrate; and
    an attachment device having a shallow counterbore formed in a rear side thereof, said fixture button being receivable into said counterbore with a relatively close tolerance friction fit between said attachment device and said outer backstop structure;
    said over-center spokes initially supporting said central plate in an advanced position relative to said outer backstop structure, said central plate being landable on the substrate and movable to a retracted position relative to said outer backstop structure to displace said over-center spokes to a relatively low profile and substantially co-planar orientation.

14. The attachment assembly of claim 13 wherein said outer backstop structure comprises a closed loop configuration.

15. The attachment assembly of claim 13 further including an adhesive bonding agent carried in a closed loop configuration by said attachment device, said central plate being temporarily secured to the substrate to pull said attachment device in a direction toward the substrate for the duration of a cure time for the adhesive bonding agent.

16. The attachment assembly of claim 13 wherein said central plate has a plurality of radially outwardly open notches for partial reception of said over-center spokes when said central plate is in said retracted position.

17. An attachment assembly for adhesive securement to a substrate, said attachment assembly comprising:
    a low profile fixture button including a central plate, an outer backstop structure, a plurality of at least three over-center spokes extending radially between said central plate and said outer backstop structure, and temporary adhesive means carried by said central plate for adhesively securing the fixture button to a substrate; and
    an attachment device formed integrally with said outer backstop structure of said fixture button;
    said over-center spokes initially supporting said central plate in an advanced position relative to said outer backstop structure, said central plate being landable on the substrate and movable to a retracted position relative to said outer backstop structure to displace said over-center spokes to a relatively low profile and substantially co-planar orientation.

18. The attachment assembly of claim 17 further including an adhesive bonding agent carried in a closed loop configuration by said attachment device, said central plate being temporarily secured to the substrate to pull said attachment device in a direction toward the substrate for the duration of a cure time for the adhesive bonding agent.

19. The attachment assembly of claim 17 wherein said central plate has a plurality of radially outwardly open notches for partial reception of said over-center spokes when said central plate is in said retracted position.

* * * * *